United States Patent [19]

Prellwitz et al.

[11] Patent Number: 4,795,201
[45] Date of Patent: Jan. 3, 1989

[54] KNOTTING METHOD FOR BALER

[75] Inventors: Hubert Prellwitz, Polenz; Günter John, Neustadt; Christian Steglich, Grimmen; Astrid Krüger, Nyast, all of German Democratic Rep.

[73] Assignee: Veb Kombinat Frotschritt Landmaschinen, Neustadt/Sachsen, German Democratic Rep.

[21] Appl. No.: 131,777

[22] Filed: Dec. 11, 1987

[30] Foreign Application Priority Data

Dec. 15, 1986 [DD] German Democratic Rep. ..... 29554

[51] Int. Cl.⁴ ............................................. B65H 69/04
[52] U.S. Cl. .......................................... 289/1.5; 289/8
[58] Field of Search ............................ 289/1.5, 5, 8, 9

[56] References Cited

U.S. PATENT DOCUMENTS

| | | | |
|---|---|---|---|
| 2,300,051 | 10/1942 | Lind | 289/1.5 |
| 2,793,890 | 5/1987 | Smith | 289/9 |
| 3,101,963 | 8/1963 | Sullivan et al. | 289/9 X |
| 3,309,124 | 3/1967 | Fürst | 289/1.5 |
| 4,506,920 | 3/1985 | Raussendorf et al. | 289/8 |

Primary Examiner—Louis K. Rimrodt
Attorney, Agent, or Firm—Herbert Dubno; Andrew M. Wilford

[57] ABSTRACT

A method of knotting with a clamp adjacent an axis and a two-jaw knotting head rotatable about the axis comprises the steps of first wrapping a strand around an object to be trussed with the strand ends together and gripping and retaining the strand ends together in the clamp with one of the strand end portions passing under the jaws of the knotting head and then upward to the object, the other strand end portion passing over the knotting head between the one end portion and the axis and then downward to the object, and the strand end portions crossing between the knotting head and the object being trussed. Then the knotting head is rotated through less than one full revolution with the jaws closed together to bring the crossing point of the strands onto the jaws and loop the one end portion around the jaws. The jaws are then opened and the head rotated through the balance of the revolution to engage both end portions between the jaws between the clamp and the axis. Thereupon the jaws are closed and the strand end portions that are looped together are pulled off the ends of the jaws to knot the strand end portions together.

3 Claims, 2 Drawing Sheets

KNOTTING METHOD FOR BALER

FIELD OF THE INVENTION

The present invention relates to a knotting system. More particularly this invention concerns a knotting method usable in a crop baler.

BACKGROUND OF THE INVENTION

In a standard knotter of the Cormick type the two ends of the loop of wire or twine, hereinafter referred to as the strand, are tied together by a knotter comprised basically of a strand holder which secures and eventually cuts the strand free from its supply and a knotting head having two vertically spaced holding and clamping jaws rotatable about a vertical axis. The knotting head lies between the holder/cutter and the bale or other item being trussed. Normally the knotting head makes a single revolution, with its jaws open at the start to capture the two strands and then closed so that the loop then formed around the jaws can be pulled over the ends in the jaws. The upper jaw has a hook which catches the two strands so that as the bale is pushed out of the compaction chamber of the baler the loop is pulled off the head to form a simple double overhand knot. This action leaves the longer of the two strands hooked in the upper jaw and formed into a loop engaged in the knot which is then pulled off the head.

In the Deering system the two strands are engaged in the same edge opening of the holder. When same is turned the opening is closed by a cam and both strands are gripped. Once again during the knotting operation the knotting head makes a single revolution about its axis, first gripping both strands and forming a loop about itself with the two strands engaging under the hook of the head. Then the jaws close. A knot puller draws the loops thus formed off the jaws and is provided with a device for cutting the strands on the far side of tee knot, that is the side away from the object being tied up.

In this arrangement after the head turns the knot puller swings toward the points of the knotting head. First then the strands are cut so as to leave two short ends of the same length. On further movement of the knot puller this knot puller draws on both strands leading from the jaws of the knotting head to the bale so that the two loops around the jaws are pulled off over the strands gripped between the upper and lower jaws and the strands are pulled straight out of the knotting head. This forms the knot and pulls it from the knotting head.

Both these systems have the disadvantage that they kink the strands considerably, that is bend them through very tight radii. As a result the knot itself will have a strength equal to at most 50% to 60% of the strength of the strand. Accordingly it is necessary to use a wire or twine whose tensile strength is substantially greater than that actually called for by the task in order to compensate for the weakness at each knot.

OBJECTS OF THE INVENTION

It is therefore an object of the present invention to provide an improved knotting system for a baler or the like.

Another object is the provision of such a knotting system for a baler or the like which overcomes the above-given disadvantages, that is which produces a knot that is about as strong as the strand it is tied in.

SUMMARY OF THE INVENTION

A method of knotting with a clamp adjacent an axis and a two-jaw knotting head rotatable about the axis according to the invention comprises the steps of first wrapping a strand around an object to be trussed with the strand ends together and gripping and retaining the strand ends together in the clamp with one of the strand end portions passing under the jaws of the knotting head and then upward to the object, the other strand end portion passing over the knotting head between the one end portion and the axis and then downward to the object, and the strand end portions crossing between the knotting head and the object being trused. Then the knotting head is rotated through less than one full revolution with the jaws closed together to bring the crossing point of the strands onto the jaws and loop the one end portion around the jaws. The jaws are then opened and the head rotated through the balance of the revolution to engage both end portions between the jaws between the clamp and the axis. Thereupon the jaws are closed and the strand end portions that are looped together are pulled off the ends of the jaws to knot the strand end portions together.

This method forms a very strong knot that does not rely on excessive kinking of the filament, so that it is as strong as the strand. This system can also be applied to two-head systems, with the clamp lying between the two knotters that are synchronously rotated, opened, and losed to form two ties around the object being trussed, herein referred to but by no means limited to a bale.

According to this invention the strand end portions are cut between the clamp and the knotting head during the last stage of the operations between the clamp and the knotting head. In addition during the first step of the operation the jaws extend transversely of the strand end portions. Then they are rotated away from the clamp and through a position pointing radially away therefrom until they are left generally pointing toward the clamp. At the end of the cycle the jaws are generally returned to the position of the first step.

DESCRIPTION OF THE DRAWING

The above and other objects, features, and advantages will become more apparent from the following, reference being made to the accompanying drawing in which.

SPECIFIC DESCRIPTION

Figure 1:
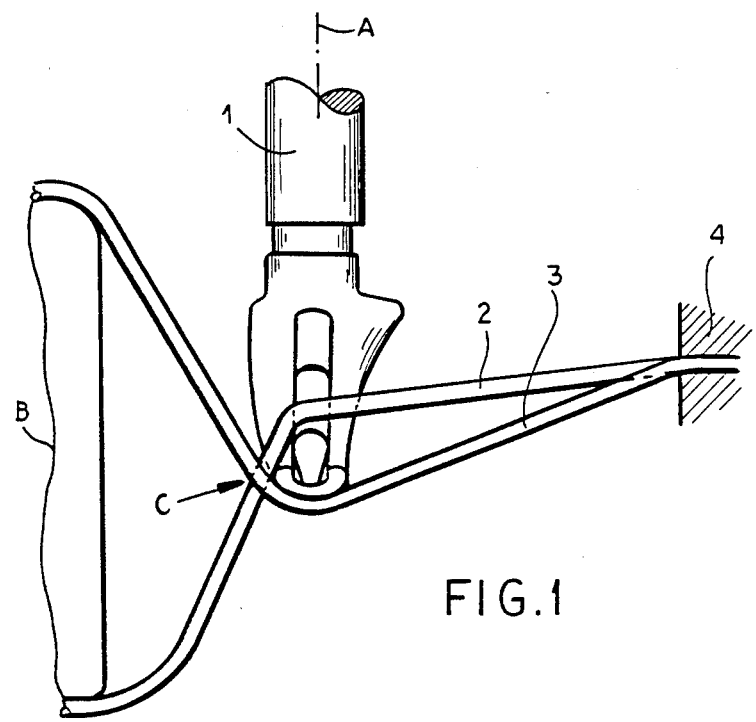
FIGS. 1, 2, 3, and 4 are side views of the knotter at successive stages of forming a knot.

As seen in FIG. 1 a standard knotter 1 is associated with a strand holder/cutter 4 shown here clamping two strands 2 and 3 that normally are the end portions of a single piece of twine wrapped around a bale B or other object to be trussed according to the invention. The knotter 1 is rotatable about a vertical axis A spaced from the clamp 4, it being noted that herein and in the claims such references to the vertical are purely for convenience and that in reality the invention would work identically with the axis A horizontal or the knotter 1 upside down relative to the position illustrated. This knotter 1 has an upper jaw 1a and a lower jaw 1b, the former being pivotal about a horizontal axis transverse to the axis A by action of a roller 1c on a not illustrated cam.

To start with according to the invention and as shown in FIG. 1 the one strand 3 extends under the lower jaw 1b and then up to the bale B. The other strand 2 extends over the upper movable jaw 1a and thence down to the bale B, between the strand 3 and the axis A and crossing the strand 3 at C between the knotter 1 and the bale B. In this position the jaws 1a and 1b are closed together and both extend generally perpendicular to the plane of the strands 2 and 3.

Figure 2:
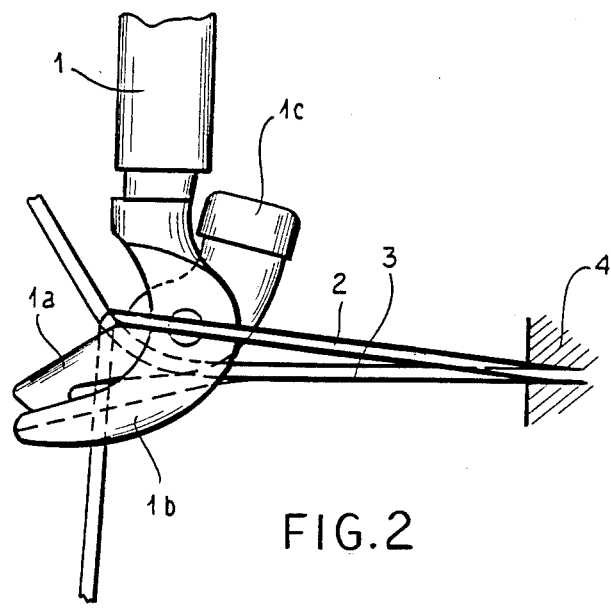

Then as shown in FIG. 2 the knotter is turned first through about 90— so as to point toward the bale B (or at least toward the first deflection points for the strands 2 and 3). This action engages the upper strand 2 within the lower strand 3. During this stage of the knotting cycle the jaws 1a and 1b remain closed.

Figure 3:
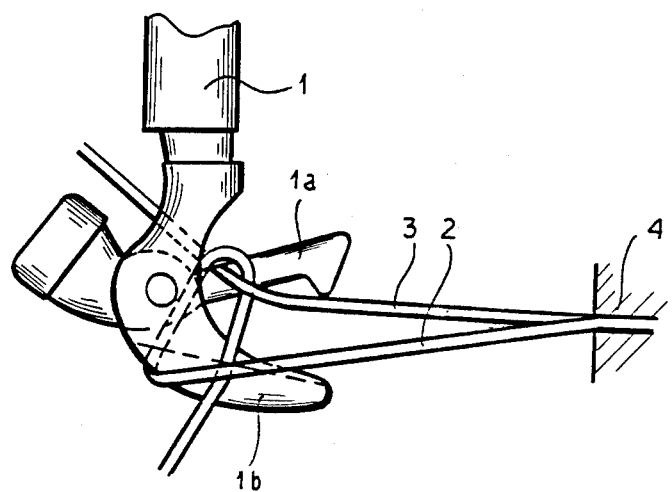

Subsequently as shown in FIG. 3 the knotter rotates through about another 180— and the jaws 1a and 1b are opened. In this position the opening defined by the jaws 1a and 1b is just level with the strands 2 and 3.

Figure 5:
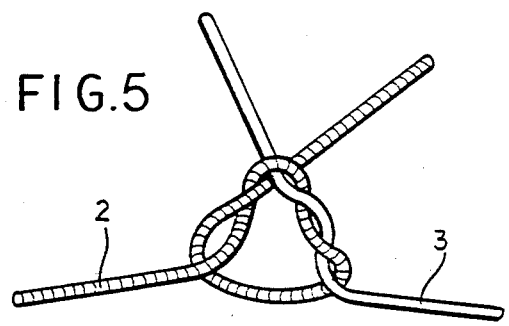
FIG. 5 is a view of the knot formed by the knotter according to this invention.
Figure 4:
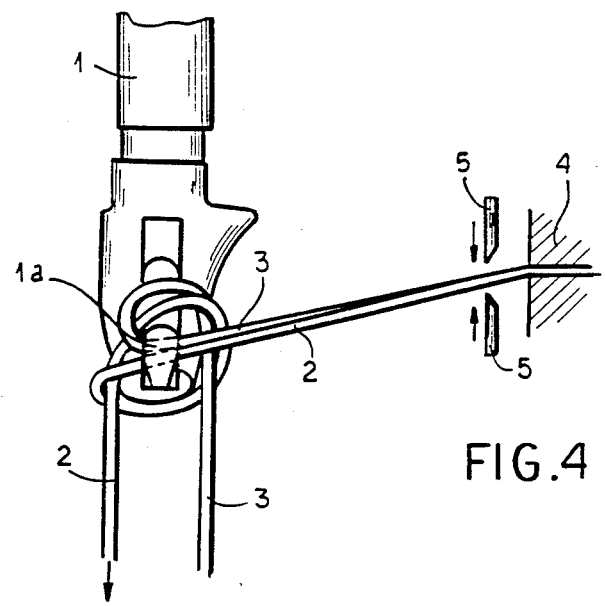

Then as shown in FIG. 4 the knotter 1 rotates another 90— to engage the strands 2 and 3 between the clamp 4 and the knotter 1 between the jaws 1a and 1b and these jaws 1a and 1b are closed. This action loops the lower strand 2 around the entire knotter and the lower jaw 1b and loops the upper strand 3 about the upper jaw 1a within the loops of the lower strand 2. Thereupon a pull on the bale-side of the 2 draws the loops off the jaws 1a and 1b and forms them into a tight knot indicated in somewhat opened condition in FIG. 5. As this knot is being drawn off and tightened cutters indicated schematically at 5 sever the strands 2 and 3 between the clamp 4 and the knotter 1.

The bale B is then pushed out o the machine and the strand 2, which is normally attached to a supply, is pulled through the clamp 4 and around the next bale to so that its end forms the new strand 3 that is engaged under the knotter 1 and in the clamp 4 at the beginning of the next knotting cycle.

WE CLAIM:
1. A method of knotting with a clamp adjacent an axis and a two-jaw knotting head rotatable about the axis, the method comprising the steps of sequentially:
 (a) wrapping a strand around an object to be trussed with the strand ends together;
 gripping and retaining the strand ends together in the clamp with
  one of the strand end portions passing under the jaws of the knotting head and then upward to the object,
  the other strand end portion passing over the knotting head between the one end portion and the axis and then downward to the object, and
  the strand end portions crossing between the knotting head and the object being trussed,
 (b) rotating the knotting head through less than one full revolution with the jaws closed together to bring the crossing point of the strands onto the jaws and loop the one end portion around the jaws;
 (c) opening the jaws and rotating the knotting head through the balance of the revolution to engage both end portions between the jaws between the clamp and the axis;
 (d) closing the jaws; and
 (e) pulling the strand end portions off the ends of the jaws and thereby knotting the strand end portions together.

2. The knotting method defined in claim 1, further comprising the step during one of steps (d) and (e) of:
 cutting the strand end portions between the clamp and the knotting head.

3. The knotting method defined in claim 1 wherein during step (a) the jaws extend transversely of the strand end portions, in step (b) the jaws are rotated away from the clamp and through a position pointing radially away therefrom, in step (c) the jaws are generally pointing toward the clamp, and in step (d) the jaws are generally returned to the position of step (a).

* * * * *